United States Patent [19]

Sakamoto et al.

[11] Patent Number: 5,614,251
[45] Date of Patent: Mar. 25, 1997

[54] METHOD AND LIQUID COATING COMPOSITION FOR THE FORMATION OF SILICA-BASED COATING FILM ON SUBSTRATE SURFACE

[75] Inventors: Yoshinori Sakamoto, Kanagawa-ken; Yoshio Hagiwara, Tokyo-to; Hatsuyuki Tanaka; Toshimasa Nakayama, both of Kanagawa-ken, all of Japan

[73] Assignee: Tokyo Ohka Kogyo Co., Ltd., Japan

[21] Appl. No.: 564,710

[22] Filed: Nov. 29, 1995

Related U.S. Application Data

[62] Division of Ser. No. 307,063, Sep. 16, 1994, Pat. No. 5,496,402.

[30] Foreign Application Priority Data

Sep. 30, 1993 [JP] Japan ................. 5-244052

[51] Int. Cl.⁶ ................................ B05D 3/02
[52] U.S. Cl. .................. 427/96; 427/377; 427/387; 427/397.7; 427/388.4
[58] Field of Search .............. 427/96, 377, 387, 427/397.7, 388.1, 388.4; 106/2, 287.16; 501/12

[56] References Cited

U.S. PATENT DOCUMENTS

| | | | |
|---|---|---|---|
| 4,605,446 | 8/1986 | Isozaki | 106/287.12 |
| 4,756,977 | 7/1988 | Haluska et al. | 428/704 |
| 4,865,649 | 9/1989 | Kashiwagi et al. | 106/287.16 |
| 4,973,526 | 11/1990 | Haluska | 428/697 |
| 5,059,448 | 10/1991 | Chandra et al. | 427/53.1 |
| 5,116,637 | 5/1992 | Baney et al. | 427/340 |
| 5,446,088 | 8/1995 | Haluska | 524/588 |

FOREIGN PATENT DOCUMENTS

| | | |
|---|---|---|
| 502010 | 5/1954 | Canada. |
| 0443760A2 | 8/1991 | European Pat. Off.. |
| 0492826A2 | 7/1992 | European Pat. Off.. |
| 2036282 | 2/1990 | Japan. |

Primary Examiner—Shrive Beck
Assistant Examiner—Erma Cameron
Attorney, Agent, or Firm—Wenderoth, Lind & Ponack

[57] ABSTRACT

Proposed is a liquid coating composition for the formation of a siliceous coating film having good storage stability against gelation for the protection, levelling or electric insulation of various substrate surfaces. The composition is a uniform solution comprising:

(A) a partial cohydrolysis-cocondensation product of (a) a first hydrolyzable silane compound represented by the general formula $HSi(OR)_3$, in which each R is, independently from the others, an alkyl group having 1 to 4 carbon atoms or a phenyl group, and (b) a second hydrolyzable silane compound represented by the general formula $Si(OR)_4$, in which each R has the same meaning as defined above, in a molar ratio of (a):(b) in the range from 1:9 to 9:1; and
(B) an organic solvent to dissolve the component (A). The storage stability of the coating composition can be improved by removing the alcohol contained therein as the hydrolysis product of the silane compounds to such a content as not to exceed 15% by weight.

3 Claims, No Drawings

METHOD AND LIQUID COATING COMPOSITION FOR THE FORMATION OF SILICA-BASED COATING FILM ON SUBSTRATE SURFACE

This is a divisional application of Ser. No. 08/307,063, filed Sep. 16, 1994 now U.S. Pat. No. 5,496,402.

BACKGROUND OF THE INVENTION

The present invention relates to a novel method and liquid coating composition for the formation of a silicon dioxide-based coating film on various substrates or, more particularly, relates to a method for the formation of a silica-based coating film by using a liquid coating composition having excellent storage stability and capable of giving a very dense and uniform siliceous coating film exhibiting good adhesion to the surface of the substrate on which the coating film is formed, such as semiconductor wafers, glass and ceramic plates, metal plates, plastic plates and the like, so as to be satisfactorily used for the formation of an interlayer insulating film, levelling film and protecting film on semiconductor devices and liquid crystal display panels, as a laminating material in the multilayer resist method and as a phase-shifter film as well as to a liquid coating composition therefor.

Along with the trend in the manufacturing technology of fine electronic devices such as VLSIs in recent years towards higher and higher degrees of integration, higher and higher working velocities and multiplicity of functions, the technology of multilayer circuit wiring is also under increasing requirements. While it is required in the manufacture of semiconductor devices to form a circuit pattern or an insulating layer on the surface of a substrate, for example, a difficulty in this case is that, when the substrate surface is not flat enough but has a level difference and a fine circuit pattern is to be formed on such a non-uniform surface having a level difference, a decrease is caused in the accuracy of the fine circuit pattern at the level difference so that such a substrate surface must be subjected to a treatment for surface levelling prior to the circuit patterning.

A conventional method for such a levelling treatment is the so-called spin-on-glass (SOG) method in which the substrate surface having a level difference is coated with a liquid coating composition which is a solution of a tetraalkoxy silane compound in an organic solvent mainly consisting of an alcohol so as to fill up the depressed areas at the level difference and to further provide a coating film on allover the surface followed by a heat treatment to form a silica-based or siliceous coating film.

The above described SOG method is advantageous in respect of the stability of the coating film because the film is formed from a completely inorganic siliceous material derived from the alkoxy silane compound but the method has a disadvantage that, because the coating solution has a relatively low viscosity, the thickness of the coating film formed by a single coating treatment is very limited rarely to exceed 0.4 μm so that a levelling layer having a sufficiently large thickness can be obtained only by repeating a large number of times of the coating works each followed by a heat treatment sometimes resulting in the formation of cracks in the thus formed film or a decrease in the adhesion of the coating film to the substrate surface.

With an object to solve the above described problem in the prior art coating compositions for the formation of a siliceous coating film, Japanese Patent Kokai 63-241076 proposes partial replacement of the tetraalkoxy silane compound mentioned above with an alkoxy silane having at least one alkyl group directly bonded to the silicon atom in the molecule. Namely, the principal ingredient in the there disclosed coating composition is a combination of a tetraalkoxy silane with an alkyl trialkoxy silane or dialkyl dialkoxy silane subjected to a partial cohydrolysis-cocondensation reaction so that the coating composition has an adequately increased viscosity to give a thickness of 1 μm or larger of the coating film formed by a single coating procedure and the coating film formed therefrom is less susceptible to crack formation by virtue of the organic groups left as bonded to the silicon atoms even after complete hydrolysis of the alkoxy silanes.

The coating film formed from the above mentioned liquid coating composition containing an alkyl-substituted alkoxy silane compound, however, has been found to have another difficult problem. While the levelling coating film formed from the coating composition is sometimes subjected to an oxygen plasma etching treatment, namely, the alkyl groups remaining in the coating film are susceptible to the attack of the oxygen plasma so that a considerable decrease in the thickness or formation of cracks is caused in the coating film by the plasma treatment although crack formation in the coating film by the oxygen plasma treatment can be prevented by an etch-back treatment necessarily leading to an increase in the manufacturing cost due to the decrease in the throughput as a consequence of the increase in the number of process steps.

SUMMARY OF THE INVENTION

The present invention accordingly has an object to provide a novel and improved liquid coating composition and a method for the formation of a silica-based coating film on a substrate surface by using the liquid coating composition capable of giving a coating film having a sufficiently large film thickness by a single coating procedure to exhibit an excellent effect of levelling and also free from the problems of crack formation therein by coating with the coating composition followed by a baking treatment and film thickness decrease and crack formation by the oxygen plasma treatment in addition to the advantages of good storage stability of the liquid coating composition as well as in the denseness, uniformity and electric insulation of the coating film so as to be satisfactorily used as a coating composition for the formation of a siliceous coating film suitable for interlayer insulation, levelling and protection in the manufacture of semiconductor devices and liquid crystal display panels.

Thus, the liquid coating composition of the invention is a uniform solution which comprises:

(A) a partial cohydrolysis-cocondensation product of
  (a) a first hydrolyzable silane compound represented by the general formula $$HSi(OR)_3, \qquad (I)$$

in which each R is, independently from the others, an alkyl group having 1 to 4 carbon atoms or a phenyl group, and (b) a second hydrolyzable silane compound represented by the general formula $$Si(OR)_4, \qquad (II)$$

in which each R has the same meaning as defined above, in a molar ratio of (a):(b) in the range from 1:9 to 9:1; and (B) an organic solvent to dissolve the component (A).

Further, the method of the invention for the formation of a silica-based coating film on a substrate surface by using a liquid coating composition comprises the steps of:

(1) coating the substrate surface with a liquid coating composition comprising, as a uniform solution:
  (A) a partial cohydrolysis-cocondensation product of
    (a) a first hydrolyzable silane compound represented by the general formula $$HSi(OR)_3, \qquad (I)$$

in which each R is, independently from the others, an alkyl group having 1 to 4 carbon atoms or a phenyl group, and
    (b) a second hydrolyzable silane compound represented by the general formula $$Si(OR)_4, \qquad (II)$$

in which each R has the same meaning as defined above, in a molar ratio of (a):(b) in the range from 1:9 to 9:1; and
  (B) an organic solvent to dissolve the component (A); to form a coating film on the substrate surface;
(2) drying the coating film on the substrate surface; and
(3) subjecting the dried coating film on the substrate surface to a baking treatment at a temperature in the range from 350° to 500° C.

While the above mentioned cohydrolysis reaction of the first and second hydrolyzable silane compounds produces an alcoholic compound of the formula ROH, R having the same meaning as defined above, as a hydrolysis by-product, it is preferable in order to increase the storage stability of the liquid coating composition that the liquid coating composition, assuming that the solvent as the component (B) is a non-alcoholic solvent, does not contain the alcoholic hydrolysis by-product in an amount exceeding 25% by weight or, preferably, 15% by weight when the content of the cohydrolysis-cocondensation product in the composition is in the range from 5 to 15% by weight calculated as $SiO_2$.

DETAILED DESCRIPTION OF THE PREFERRED EMBODIMENTS

As is described above, the principal ingredient, i.e. the component (A), in the liquid coating composition of the invention and used in the inventive method is a partial cohydrolysis-cocondensation product of two kinds of specific hydrolyzable silane compounds including the first and second silane compounds represented by the general formulas (I) and (II), respectively, in combination in a specified molar proportion. The group denoted by R in each general formula is an alkyl group having 1 to 4 carbon atoms including methyl, ethyl, propyl and butyl groups or a phenyl group.

The first hydrolyzable silane compound of the general formula (I), which has three hydrolyzable groups denoted by RO and a hydrogen atom directly bonded to the silicon atom in a molecule, is exemplified by: trimethoxy silane; triethoxy silane; tripropoxy silane; tributoxy silane; triphenyloxy silane; methoxy diethoxy silane; methoxy dipropoxy silane; methoxy dibutoxy silane; methoxy ethoxy propoxy silane; ethoxy dimethoxy silane; ethoxy dipropoxy silane; ethoxy diphenyloxy silane; ethoxy propoxy butoxy silane; propoxy dimethoxy silane; propoxy diethoxy silane; propoxy butoxy phenyloxy silane; butoxy diphenyloxy silane; butoxy dimethoxy silane; phenyloxy dimethoxy silane; phenyloxy diethoxy silane and the like, of which trimethoxy silane; triethoxy silane; tripropoxy silane; tributoxy silane and triphenyloxy silane are preferable and trimethoxy silane and triethoxy silane are more preferable. These hydrolyzable silane compounds can be used either singly or as a combination of two kinds or more according to need.

The second hydrolyzable silane compound of the general formula (II) having four hydrolyzable groups RO in a molecule is exemplified by: tetramethoxy silane; tetraethoxy silane; tetrapropoxy silane; tetrabutoxy silane; tetraphenyloxy silane; methoxy triethoxy silane; methoxy tripropoxy silane; methoxy tributoxy silane; methoxy triphenyloxy silane; methoxy diethoxy propoxy silane; methoxy diethoxy butoxy silane; ethoxy trimethoxy silane; ethoxy tripropoxy silane; ethoxy tributoxy silane; ethoxy triphenyloxy silane; ethoxy dimethoxy propoxy silane; ethoxy dimethoxy butoxy silane; ethoxy dipropoxy butoxy silane; propoxy trimethoxy silane; propoxy triethoxy silane; butoxy trimethoxy silane; butoxy triethoxy silane; phenyloxy triethoxy silane; phenyloxy tributoxy silane and the like, of which tetramethoxy silane; tetraethoxy silane; tetrapropoxy silane; tetrabutoxy silane and tetraphenyloxy silane are preferable and tetramethoxy silane and tetraethoxy silane are more preferable. These tetrafunctionally hydrolyzable silane compounds can be used either singly or as a combination of two kinds or more according to need.

In the preparation of the liquid coating composition of the invention and used in the inventive method, the above described first and second hydrolyzable silane compounds are used in combination in a molar ratio in the range from 1:9 to 9:1 or, preferably, from 1:4 to 2:1. When the molar ratio is outside of this range, a decrease is caused in the storage stability of the liquid coating composition or cracks are sometimes formed in the coating film formed from the coating composition.

The liquid coating composition mentioned above is prepared by dissolving the above described first and second hydrolyzable silane compounds in a specified molar ratio in an organic solvent to form a solution of the silanes which is admixed with water and an acid as the catalyst to effect partial cohydrolysis-cocondensation reaction of the hydrolyzable silanes. The organic solvent suitable here is exemplified by monohydric alcohols such as methyl alcohol, ethyl alcohol, propyl alcohol and butyl alcohol, polyhydric alcohols such as ethyleneglycol, diethyleneglycol, propyleneglycol, glycerin, trimethylol propane and hexane triol, monoethers of polyhydric alcohols such as ethyleneglycol monomethyl ether, ethyleneglycol monoethyl ether, ethyleneglycol monopropyl ether, ethyleneglycol monobutyl ether, diethyleneglycol monomethyl ether, diethyleneglycol monoethyl ether, diethyleneglycol monopropyl ether, diethyleneglycol monobutyl ether, propyleneglycol monomethyl ether, propyleneglycol monoethyl ether, propyleneglycol monopropyl ether and propyleneglycol monobutyl ether, esters such as methyl acetate, ethyl acetate and butyl acetate, ketones such as acetone, methyl ethyl ketone and methyl isoamyl ketone, fully etherified polyhydric alcohol ethers such as ethyleneglycol dimethyl ether, ethyleneglycol diethyl ether, ethyleneglycol dipropyl ether, ethyleneglycol dibutyl ether, propyleneglycol dimethyl ether, propyleneglycol diethyl ether, propyleneglycol dipropyl ether, propyleneglycol dibutyl ether, diethyleneglycol dimethyl ether, diethyleneglycol diethyl ether, diethyleneglycol dipropyl ether, diethyleneglycol dibutyl ether and so on, of which those belonging to the last mentioned class, i.e. fully etherified polyhydric alcohol ethers, are particularly preferable. These organic solvents can be used either singly or as a combination of two kinds or more.

The amount of the organic solvent used in the preparation of the liquid coating composition is not particularly limitative and naturally depends on the desired concentration of the film-forming ingredient, i.e. the partial cohydrolysiscocondensation product of the first and second hydrolyzable silane compounds. It is usual, however, that the organic solvent is used in an amount in the range from 2 to 10 parts by weight per part by weight of the total amount of the first and second hydrolyzable silane compounds.

The solution of the hydrolyzable silane compounds in the above described organic solvent is admixed with an acid as the catalyst to promote the reaction of cohydrolysis and cocondensation of the hydrolyzable silanes together with water. Suitable acids as the catalyst include organic and inorganic acids exemplified by acetic acid, propionic acid and butyric acid as the organic ones and hydrochloric acid, nitric acid, sulfuric acid and phosphoric acid as the inorganic ones, of which nitric acid and phosphoric acid are preferable and nitric acid is more preferable in respect of the storage stability of the coating composition as well as in respect of the upper limit thickness (see Examples) of the coating film obtained from the coating composition.

The solution of the hydrolyzable silane compounds is admixed with water as the hydrolyzing agent of the silane compounds in an amount in the range from 1.5 to 4.0 moles per mole of the total amount of the first and second hydrolyzable silane compounds. The acid catalyst is added to the solution either after addition of water or as an aqueous acid solution. The amount of the acid catalyst is, usually, in the range from 300 to 800 ppm by weight or, preferably, from 400 to 600 ppm by weight based on the total amount of the silane solution subjected to the partial cohydrolysis-cocondensation reaction. The reaction can proceed even at room temperature at a moderate velocity but, when acceleration of the reaction is desired, the aqueous acid solution is added dropwise to the solution of the hydrolyzable silane compounds at an elevated temperature not exceeding 80° C. The reaction is complete usually within 5 to 100 hours depending on the temperature and the strength of the acid catalyst.

The liquid coating composition prepared in the above described manner can be used as such for a coating treatment of various substrate surfaces although it is optional according to need that the composition is admixed with an additional amount of an organic solvent in order to have an adequately adjusted viscosity or to control the content of the film-forming ingredient calculated as $SiO_2$. The organic solvent used for dilution is preferably the same one as that used in the preparation of the composition. Since the film-forming constituent in the coating composition is an organopolysiloxane having hydrogen atoms directly bonded to the silicon atoms, it should be noted that the content of alcoholic solvents therein should be as low as possible or, assuming that the content of the cohydrolysis-cocondensation product in the composition is in the range from 5% to 15% by weight calculated as $SiO_2$, should not exceed 25% by weight or, preferably, 15% by weight of the total amount of the composition including the organic solvents used in the preparation as well as for dilution of the composition and the alcohols produced as a hydrolysis product of the hydrolyzable silane compounds in respect of the storage stability of the composition because the silicon-bonded hydrogen atoms react with an alcohol resulting in eventual gelation of the composition. This is the reason for the preference of a fully etherified polyhydric alcohol as the organic solvent not only in the preparation but also for dilution of the liquid coating composition. When the composition contains an excessive amount of an alcoholic compound as produced by the cohydrolysis reaction of the silane compounds, it is desirable that the liquid composition is subjected to distillation under reduced pressure of 30 to 300 mmHg or, preferably, 50 to 200 mmHg at a temperature in the range from 20° to 50° C. for 2 to 6 hours in order to remove the excessive amount of the alcoholic compound.

Since the silicon-bonded hydrogen atoms are left unreacted forming trifunctional siloxane units in the structure of the coating film after curing, a coating film having a relatively large thickness of about 1 μm or larger can be obtained by a single coating procedure without the trouble of crack formation using the liquid coating composition having an adequate viscosity and containing non-volatile film-forming constituent in a large content. Further, the cured coating film contains no organic groups bonded to the silicon atoms so that the cured coating film is highly resistant against the attack of oxygen plasma not to cause a decrease in the film thickness or crack formation by the oxygen plasma treatment and an excellent levelling effect can be exhibited even without the etch-back treatment.

Curing of the coating film formed by applying the liquid coating composition to a substrate surface can proceed, after drying, even at room temperature although a considerably long time is taken for complete curing. It is of course that the curing reaction of the coating film can be accelerated by baking in air or, preferably, in an atmosphere of nitrogen at an increased temperature, preferably, of 350° C. or higher or, preferably, in the range from 350° to 500° C. so that not only the curing reaction is accelerated but also the cured siliceous film can be imparted with improved physical properties. Introduction of water vapor into the atmosphere for the baking treatment of the coating film is advantageous for obtaining further improvement of the physical properties of the cured coating film.

In the following, examples and comparative examples are given to illustrate the liquid coating composition and the coating method by using the liquid coating composition according to the invention in more detail.

EXAMPLE 1

Into a solution prepared by dissolving 164 g (1 mole) of triethoxy silane and 208 g (1 mole) of tetraethoxy silane in 1932 g of ethyleneglycol dimethyl ether was added dropwise an aqueous solution of 0.40 ml of concentrated nitric acid in 90 g (5 moles) of deionized water followed by further continued agitation for about 6 hours at room temperature. The mixture was, after standing for 3 days at room temperature, subjected to distillation under a reduced pressure of 150 mmHg at 40° C. taking 4 hours to give 1000 g of a liquid coating composition, referred to as the composition I hereinafter, containing 12% by weight of non-volatile matters calculated as $SiO_2$ and 10% by weight of ethyl alcohol.

A 4-inch silicon wafer having a vapor-deposited aluminum layer on the surface with a stepped level difference of 1.0 μm height was coated with the composition I on a spinner rotating at 3000 rpm taking 30 seconds followed by drying and baking at 450° C. for 30 minutes in an atmosphere of nitrogen to effect curing of the coating film which was examined using a scanning electronmicroscope to find that the film thickness was 1.0 μm, the condition of levelling at the stepped levels was good and no cracks were formed in the cured coating film. The composition I was stable at room temperature without gelation for one month or longer.

EXAMPLE 2

Into a solution prepared by dissolving 164 g (1 mole) of triethoxy silane and 152 g (1 mole) of tetramethoxy silane in 1876 g of ethyleneglycol diethyl ether was added dropwise an aqueous solution of 0.32 ml of concentrated nitric acid in 90 g (5 moles) of deionized water followed by further continued agitation for about 6 hours at room temperature. The mixture was, after standing for 3 days at room temperature, subjected to distillation under a reduced pressure of 150 mmHg at 40° C. taking 4 hours to give 1000 g of a liquid coating composition, referred to as the composition II hereinafter, containing 12% by weight of non-volatile matters as $SiO_2$ and 10% by weight of ethyl and methyl alcohols.

The composition II was subjected to the same evaluation test as in Example 1 to find that the film thickness was 1.0 μm, the condition of levelling at the stepped levels was good and no cracks were formed in the cured coating film. The composition II was stable at room temperature without gelation for one month or longer.

EXAMPLE 3

Into a solution prepared by dissolving 656 g (4 moles) of triethoxy silane and 208 g (1 mole) of tetraethoxy silane in 2770 g of propyleneglycol dimethyl ether was added dropwise an aqueous solution of 0.80 ml of concentrated nitric acid in 108 g (6 moles) of deionized water followed by further continued agitation for about 6 hours at room temperature. The mixture was, after standing for 2 days at room temperature, subjected to distillation under a reduced pressure of 150 mmHg at 40° C. taking 4 hours to give 2500 g of a liquid coating composition, referred to as the composition III hereinafter, containing 12% by weight of non-volatile matters as $SiO_2$ and 5% by weight of ethyl alcohol.

The composition III was subjected to the same evaluation test as in Example 1 to find that the film thickness was 1.0 μm, the condition of levelling at the stepped levels was good and no cracks were formed in the cured coating film. The composition III was stable at room temperature without gelation for about three weeks.

EXAMPLE 4

Into a solution prepared by dissolving 164 g (1 mole) of triethoxy silane and 208 g (1 mole) of tetraethoxy silane in 1038 g of ethyleneglycol dimethyl ether was added dropwise an aqueous solution of 0.60 ml of concentrated nitric acid in 90 g (5 moles) of deionized water followed by further continued agitation for about 6 hours and standing for 3 days at room temperature to give a liquid coating composition, referred to as the composition IV hereinafter, containing 8.0% by weight of non-volatile matters as $SiO_2$ and 21% by weight of ethyl alcohol.

The composition IV was subjected to the same evaluation test as in Example 1 to find that the film thickness was 1.0 μm, the condition of levelling at the stepped levels was good and no cracks were formed in the cured coating film. The composition IV was stable at room temperature without gelation for about two weeks.

COMPARATIVE EXAMPLE 1

Into a solution prepared by dissolving 208 g (1 mole) of tetraethoxy silane in 219 g of ethyl alcohol was added dropwise an aqueous solution of 0.20 ml of concentrated nitric acid in 72 g (4 moles) of deionized water followed by further continued agitation for about 6 hours and standing for 10 days at room temperature to give a liquid coating composition, referred to as the composition V hereinafter, containing 12% by weight of non-volatile matters as $SiO_2$.

The composition V was subjected to the same evaluation test as in Example 1 to find that the film thickness was 1.0 μm and the condition of levelling at the stepped levels was good but cracks were formed in the cured coating film. The composition V was stable at room temperature without gelation for two months.

COMPARATIVE EXAMPLE 2

Into a solution prepared by dissolving 164 g (1 mole) of triethoxy silane in 548 g of ethyleneglycol diethyl ether was added dropwise an aqueous solution of 0.32 ml of concentrated nitric acid in 54 g (3 moles) of deionized water followed by further continued agitation for about 6 hours at room temperature. The mixture was, after standing for 3 days at room temperature, subjected to distillation under a reduced pressure of 150 mmHg at 40° C. taking 4 hours to give 500 g of a liquid coating composition, referred to as the composition VI hereinafter, containing 12% by weight of non-volatile matters as $SiO_2$ and 10% by weight of ethyl alcohol.

The composition VI was applied to the surface of a 4-inch silicon wafer on a spinner in the same manner as in Example 1 but the coating film thus formed had cloudy appearance. The composition VI was found not to be practically usable because gelation of the compositin took place before long after preparation.

EXAMPLE 5

A 4-inch silicon wafer was coated with the coating composition I prepared in Example 1 on a spin coater rotating at 3000 rpm taking 20 seconds followed by drying and a pre-baking treatment on a hot plate first at 80° C. for 1 minute, then at 150° C. for 1 minute and finally at 200° C. for 1 minute. Thereafter, a baking treatment was performed in an atmosphere of nitrogen at 450° C. for 30 minutes.

In order to examine the susceptibility of the cured coating film to crack formation, the above described procedure including coating with the composition, pre-baking and baking was repeated 4 times until a crack was detected in the thus cured coating film to record the thickness of the coating film when a crack was first detected therein. The thickness, referred to as the upper limit thickness, was 1.3 μm.

In the above described experimental procedure, the thickness of the layer formed by the first coating was determined after the pre-baking treatment at 200° C. and after the baking treatment at 450° C. to calculate the shrinkage in the film thickness in %, which is a ratio of the decrease in the thickness to the thickness after the pre-baking treatment. This value, which can be a measure for the occurrence of crack formation, was 6%.

With an object to examine the denseness of the cured coating film, furthermore, the silicon wafer having the cured coating film after the baking treatment at 450° C. was dipped in an aqueous solution containing 0.1% by weight of hydrofluoric acid at 25° C. for 30 minutes to determine the wet-etching rate. The result was 5.2 nm/minute.

COMPARATIVE EXAMPLE 3

Into a solution prepared by dissolving 136 g (1 mole) of methyl trimethoxy silane and 152 g (1 mole) of tetramethoxy silane in 600 g of isopropyl alcohol was added dropwise an aqueous solution of 0.053 ml of concentrated nitric acid in 126 g (7 moles) of deionized water followed by continued agitation for about 6 hours and standing for 5 days at room temperature to give a liquid coating composition, referred to as the composition VII hereinafter, containing 12% by weight of non-volatile matters as $SiO_2$.

The same testing procedures as in Example 5 were under-taken except that the coating composition I was replaced with the coating composition VII and the number of repeated cycles of coating, pre-baking and baking treatments was 5 to give results that the upper limit thickness was 1.8 μm, shrinkage was 7% and the wet-etching rate was 6.0 nm/minute.

COMPARATIVE EXAMPLE 4

The same testing procedures as in Comparative Example 3 were undertaken excepting replacement of the coating composition VII with the coating composition V prepared in Comparative Example 1 to give results that the upper limit thickness was 0.5 μm, shrinkage was 11% and the wet-etching rate was 7.0 nm/minute.

EXAMPLE 6

A test specimen on a 4-inch silicon wafer was prepared in just the same manner as in Example 5 including the steps of coating, pre-baking and baking treatments.

The test specimen was exposed for 60 minutes to oxygen plasma generated in a plasma generating apparatus (Model OPM-EM1000, manufactured by Tokyo Ohka Kogyo Co.) under a pressure of 1.0 Torr to examine the decrease in the thickness of the cured coating film caused by the plasma exposure and the wet-etching rate of the coating film was measured in the same manner as in Example 5 before and after the plasma exposure. The results of testing were that the shrinkage by the plasma exposure was 1.1% and the wet-etching rate was 5.2 nm/minute and 4.5 nm/minute before and after the plasma exposure, respectively.

COMPARATIVE EXAMPLE 5

The experimental procedure was the same as in Example 6 described above excepting replacement of the coating composition I with the coating composition VII.

The results of testing were that the shrinkage by the plasma exposure was 14.9% and the wet-etching rate was 6.0 nm/minute before the plasma exposure but the wet-etching rate after the plasma exposure could not be determined because lifting of the cured coating film from the substrate surface took place by the plasma exposure.

COMPARATIVE EXAMPLE 6

The experimental procedure was the same as in Example 6 described above excepting replacement of the coating composition I with the coating composition V.

The results of testing were that the shrinkage by the plasma exposure was 0.3% and the wet-etching rate was 7.0 nm/minute and 5.8 nm/minute before and after the plasma exposure, respectively.

What is claimed is:

1. A method for the formation of a silica-based coating film on a substrate surface by using a liquid coating composition which comprises the steps of:
(1) coating the substrate surface with a liquid coating composition comprising, as a solution:
   (A) a partial cohydrolysis-cocondensation product of
      (a) a first hydrolyzable silane compound represented by the general formula $HSi(OR)_3$ 

in which each R is, independently from the others, an alkyl group having 1 to 4 carbon atoms or a phenyl group, and
      (b) a second hydrolyzable silane compound represented by the general formula $Si(OR)_4$ 

in which each R has the same meaning as defined above, in a molar ratio of (a):(b) in the range from 1:9 to 9:1; and
   (B) an organic solvent which is a combination of an alkyleneglycol dialkyl ether and an alcohol as the hydrolysis product of the first and second hydrolyzable silane compounds, the amount of the alcohol not exceeding 15% by weight of the composition to dissolve the component (A), to form a coating film on the substrate surface;
(2) drying the coating film on the substrate surface; and
(3) subjecting the dried coating film on the substrate surface to a baking treatment at a temperature in the range from 350° to 500° C.

2. The method according to claim 1 in which the baking treatment of the dried coating film on the substrate surface in step (3) is performed in an atmosphere of nitrogen.

3. The method according to claim 1 wherein the molar ratio of the first hydrolyzable silane compound to the second hydrolyzable silane compound is within the range of from 1:4 to 2:1.

* * * * *